United States Patent [19]

Bergstrom

[11] 4,366,624
[45] Jan. 4, 1983

[54] ARRANGEMENT FOR BENCHES FOR MEASURING AND STRAIGHTENING VEHICLES

[75] Inventor: Hans R. Bergstrom, Kungsor, Sweden

[73] Assignee: Aktiebologet Samefa, Kungsor, Sweden

[21] Appl. No.: 254,480

[22] Filed: Apr. 15, 1981

[30] Foreign Application Priority Data

Sep. 12, 1980 [SE] Sweden ............................. 8006417

[51] Int. Cl.³ .......................................... G01B 5/255
[52] U.S. Cl. ............................ 33/180 AT; 33/174 L; 33/203; 33/288
[58] Field of Search ........... 33/180 AT, 181 AT, 203, 33/288, 174 L, 174 G, 203.18

[56] References Cited

U.S. PATENT DOCUMENTS

| | | | |
|---|---|---|---|
| 4,023,883 | 12/1981 | MacGregor | 33/180 AT |
| 4,098,003 | 7/1978 | Negrin | 33/180 AT |
| 4,193,203 | 3/1980 | Le Grand et al. | 33/180 AT |
| 4,207,681 | 6/1980 | Bayorgeon et al. | 33/180 AT |
| 4,319,402 | 3/1982 | Martin | 33/181 AT |
| 4,321,754 | 3/1982 | Colby | 33/180 AT |
| 4,329,784 | 5/1982 | Bjork | 33/180 AT |
| 4,342,154 | 8/1982 | Legrand | 33/180 AT |

*Primary Examiner*—William D. Martin, Jr.
*Attorney, Agent, or Firm*—Barnes, Kisselle, Raisch & Choate

[57] ABSTRACT

Apparatus for measuring and checking vehicle bodies comprises a bench with a co-acting measuring bridge. In a known way, a vehicle body can be clamped over the bench and selected points on the body can be located from underneath by means of slides with pointed measuring pins which form part of a known measuring bridge, for the accurate determination of the relative location of points on the body. An overhead measuring stand enables points located high up on the body to be measured from above in order to obtain reliable measurement values. By means of a special orientation device the position of the normal measuring bridge relative to the overhead measuring stand is determined so that both give corresponding measurement values. The measuring stand is preferably equipped with a telescopically extensible locating pin which is positioned in the plane of symmetry of the body and by means of which the symmetrical position of various points on the body can be checked.

7 Claims, 6 Drawing Figures

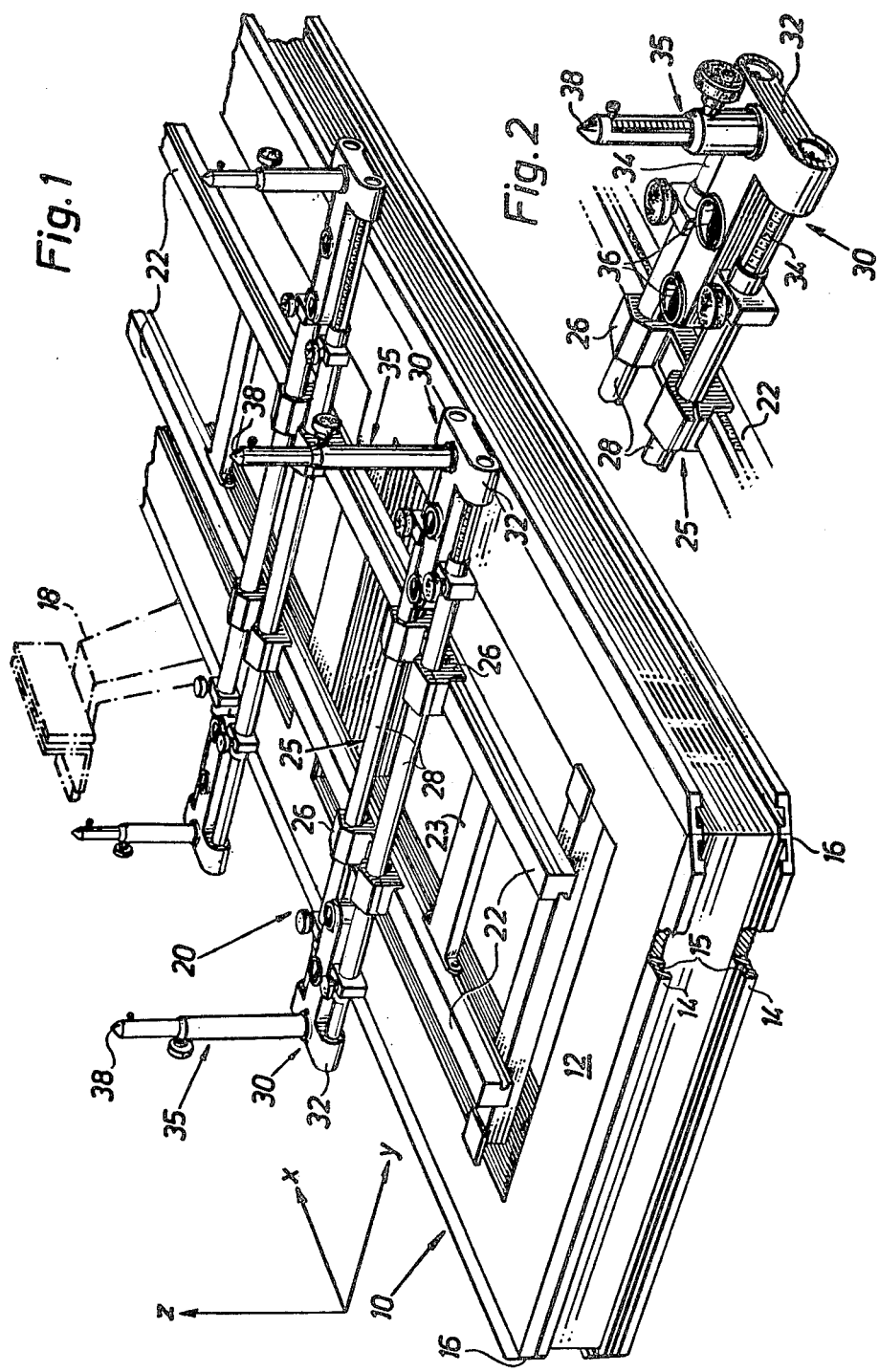

ARRANGEMENT FOR BENCHES FOR MEASURING AND STRAIGHTENING VEHICLES

The present invention relates to a measuring and checking arrangement for the body or chassis of a motor vehicle, and, more particularly, to an arrangement for the more precise measurement and checking of the position of specific important points on the chassis or body concerned.

As is known, a modern automobile is based on a shell construction of sheet metal which forms the bearing frame or bodywork of the car. The structure forms a coherent unit and at exactly determined points it supports the other parts of the car, such as the engine, wheel suspension, steering arrangement, etc. With its sheet metal structure a car thus forms a unitary system where all the component parts are accurately aligned and oriented in relation to each other. Normally, for the safe functioning of the car it is important that this orientation of the various parts is maintained and that this correct orientation is re-established after damage has occurred, for example, after a crash.

In the body of every car there are important control points or measuring points, the relative positions of which are exactly specified by the car manufacturer. After bodywork repairs have been carried out and also whenever there is reason to suspect that deformation has occurred after an accident, even a slight one, the position of the measurement points should be checked and, if necessary, adjusted.

A known arrangement for checking and straightening vehicle bodies consists of a fixed set-up bench in the form of a strong welded steel frame over which the body to be examined is suspended with the aid of fixed, so-called bodywork clamps which are releasably locked to the sides of the bench and engage the body at appropriate points. The bench is equipped with an accurately machined reference surface, preferably on the upper face of the bench, and on this surface the measuring rail system of a so-called measuring bridge, which consists of accurately co-acting rails or slides equipped with scales, is mounted. With the aid of this rail system pointed measuring pins can be displaced along three axes at right angles to each other which coincide with the longitudinal direction (x), transverse direction (y) and vertical direction (z) of the body. The measuring bridge is first fixed as a whole in a precise position of symmetry relative to the body being examined, after which, by means of the pointed measuring pins the various measuring or control points on the body are checked. With the aid of a scale on the measuring bridge the spatial position of the measuring points can be determined accurately. After comparison with the data from the manufacturer, it can be ascertained if they are in the correct position or not.

In the arrangement described above the measuring points are located from below. Both the body and the measuring bridge are mounted in fixed relation on the bench and the pointed measuring pins of the measuring bridge are moved up under the body to locate the checking points. However, very many modern bodywork structures have important checking points which are located rather high up on the body and this applies particularly to the fittings for the long spring struts known as McPhearson struts which are installed in many cars between each front wheel and a point at an angle above the wheel, rather high up on the body. The base bench with the measuring bridge lies well below the body and naturally a certain element of doubt is involved in locating with the end of a long measuring rod a point which lies high above the measuring bridge. Even if the measuring bridge is in itself of stable construction and firmly supported, it is inevitable that the natural elasticity of the long free supporting measuring rods may introduce errors or inaccuracies into the measurements.

In such cases it would certainly be more expedient if it were possible for the measurement and checking of such points located high up to be effected from above. However, there is then the difficult problem of how, while retaining the measuring system lying below the body, another measuring system lying above the body could be introduced and how the two systems could be "tied in together" in a simple and accurate way with regard to measurement technology so that both give unequivocal, corresponding measurement results.

This invention is intended to provide such a complementary measuring system which can be used in combination with a conventional measuring and checking system of the type previously described without the conventional measuring system being subjected to any mechanical interference or requiring machining operations to accommodate the necessary parts. This is accomplished by mounting an overhead measuring stand directly on the set-up bench and precisely locating it in relation to the measuring bridge on the set-up bench by means of a gauging adjustment rail adapted to releasably interconnect the measuring bridge and the overhead measuring stand.

The invention will now be described in an exemplified version with reference to the attached drawings, in which:

FIG. 1 is a schematic perspective view of part of a conventional measuring and checking arrangement for vehicle chassis or bodies which includes a bench base and a measuring bridge which co-acts therewith;

FIG. 2 shows a detail of the measuring bridge on a larger scale;

Figure 3:
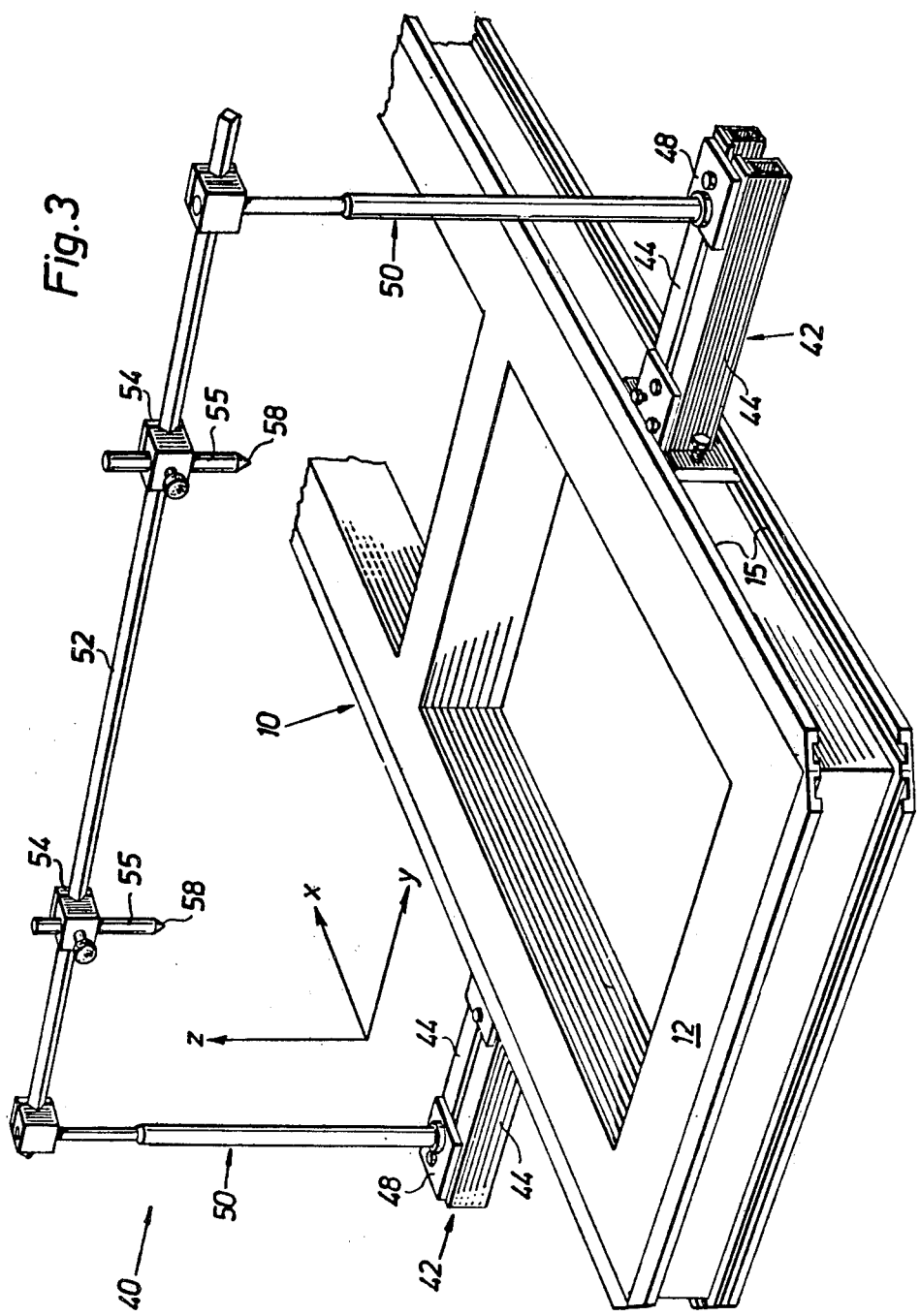
FIG. 3 is a schematic perspective view of the measuring stand which includes the supplementary measuring arrangement according to this invention.

In order to make the background of the invention clear, FIGS. 1 and 2 show schematically part of a conventional measuring system consisting of a locationally fixed set-up bench, generally designated 10, which supports and co-acts with a measuring bridge, generally designated 20. The bench 10 consists of a strong, welded steel frame, the upper surface 12 of which has been machined and smoothed so that a plane reference surface is obtained. Welded along the upper and lower edges of the rectangular frame there are strong edging strips 14 which have been machined so that they jointly form a T-shaped track 15 extending around the perimeter of the frame as shown in FIG. 1. Corners 16 of the bench frame 10 are chamfered so that entrances into the peripheral T-shaped tracks are formed.

By means of the T-shaped track 15 various fittings can be connected to the bench frame, such as bodywork clamps, for example, one of which is indicated at 18 in FIG. 1, and by means of which a vehicle body can be clamped over the bench so that it is connected securely and immovably to the latter. Moreover, the T-shaped track can form a mounting for wheel supports (not illustrated) so that the bench as a whole can be moved as desired.

The self-contained measuring bridge 20 is positioned on the flat upper face 12 of the bench frame. Briefly, in the embodiment shown, the measuring bridge consists of two parallel rails 22 (elongated in the x direction) on which transverse slides 25 may be displaced lengthwise. Rails 22 are connected by cross braces 23 to form a rigid frame movably supported on the top face of the bench. Each such slide 25 consists of two sliding blocks 26, each co-acting with its rail 22 and supporting two parallel transverse tubes 28. In each of their ends the slides 25 support an outer slide 30 (see FIG. 2) which consists of a measuring tool holder 32 connected to two parallel control tubes 34 which are telescopically accommodated in the ends of the transverse tubes 28 of each longitudinal slide 25. Each holder 32 is equipped with a number of fixed bushings 36 designed to guide and hold a telescopically extensible measuring and locating tool 35 for measuring height. The pointed upper end 38 of tool 35 is used during the measurement process to locate from below the measurement point concerned on the body which is thus suspended on the clamps 18 over the bench 10 for the examination.

From the above it will be seen that the vertical measuring tool 35 can be moved in the transverse direction (the y direction) since the guide tube 34 of the holders 32 slides telescopically in the storage tube 28 of the transverse slides 25. The slides 25, and thus the tools 35, can in turn be moved in the longitudinal direction (the x direction) of the bench 10 on the rails 22 and, finally, the pointed ends 38 can be adjusted in the vertical direction (the z direction) because the telescopic measuring tool 35 can be extended or shortened. With the aid of suitably positioned and accurately designed measuring scales all of the measurement values can be read off. The measuring bridge 20, the position of which can be established as required on the bench 10, is set up as a whole before the measurement readings are taken so that its relationship to the body suspended above is such that its longitudinal axis of symmetry (the x axis) extends in the longitudinal plane of symmetry of the body, this positioning being effected in the initial set up by locating the tools 35 relative to designated orientation or reference points on the body.

As mentioned in the introduction, a degree of uncertainty can arise in the measurements when the height measuring tool 35 needs to be very long, i.e., when it is used for checking reference points located very high up on the body, since the elastic bowing of long free supporting elements is unavoidable, and, therefore, measurement errors resulting from this are also unavoidable, even if the element is of stable construction in itself. To eliminate this drawback, according to the invention an arrangement on the principle shown in FIG. 3 is proposed, with which these high measurement points can be located from above, at a short distance from a stable reference system. The latter consists of a generally inverted U-shaped measuring stand 40 which comprises mountings or supports 42 which are engaged in the T-shaped track 15 on the bench 10 and, thereby, obtain a fixed anchorage. Each support 42 comprises two laterally projecting rigid beams 44, the upper faces of which are smoothed and support the slideable base plates 48 of telescopically extensible, vertical columns 50. The stand 40 thus comprises two vertically parallel, rigid columns 50 disposed opposite each other and on either side of the bench 10. The upper ends of columns 50 are connected by means of a rigid transverse beam 52 in the form of a four-sided tube. On this tube blocks 54 are slideably mounted, each slideably holding a vertical measuring rod 55 with a pointed lower end 58. From the schematic view in FIG. 3 and the above description it will be seen that on a vehicle body which is suspended over the bench 10, but below the crossbeam 52 of the stand 40, measurement or reference points can be located by means of the pointed measurement ends 58 of the stand by bringing the stand into a suitable position over the bench 10 and then adjusting the blocks 54 and the measuring rods 55 with the pointed ends 58.

Due to the firm beam mountings or supports 42 which engage rigidly with the base bench 10, the stand 40 is endowed with the necessary stability for carrying out the measurements, but the problem arises of how this supplementary and complementary measuring system which stand 40 provides can be coordinated with the necessary accuracy and precision with the primary measuring bridge 20 resting on the bench 10. In other words, the problem is how the stand 40 can be located sufficiently accurately relative to bridge 20 and, particularly, tools 35, for the measurements "from below" and "from above" to give the same values. Advantageously, stand 40 should also be oriented so that the center point of the crossbeam 52 coincides with the longitudinal plane of symmetry (the x-z plane) of the measuring bridge 20 and, thus, also of the body.

Figure 4:
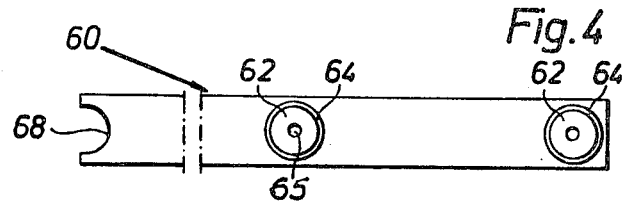
FIG. 4 is a plan view of an orientation rail for adjusting the measuring stand relative to the measuring bridge.
Figure 5:
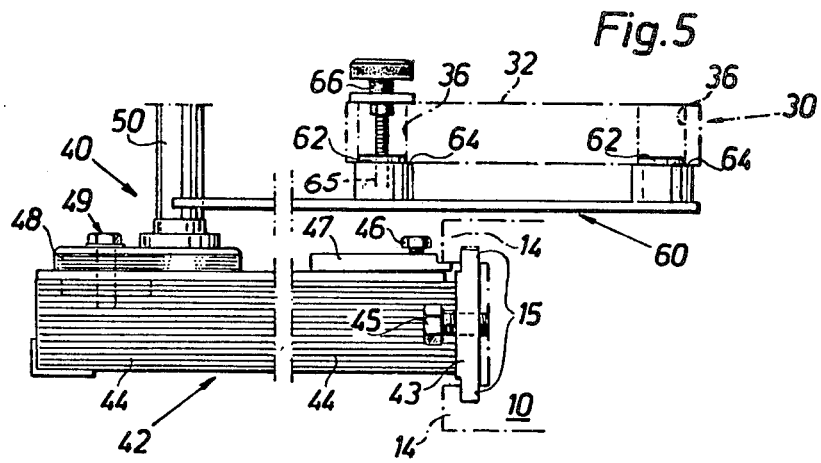
FIG. 5 shows clearly how the orientation rail is used for coordinating the normal measuring bridge (the "lower" measuring system) and the measuring stand (the "upper" measuring system) according to the invention.
Figure 6:
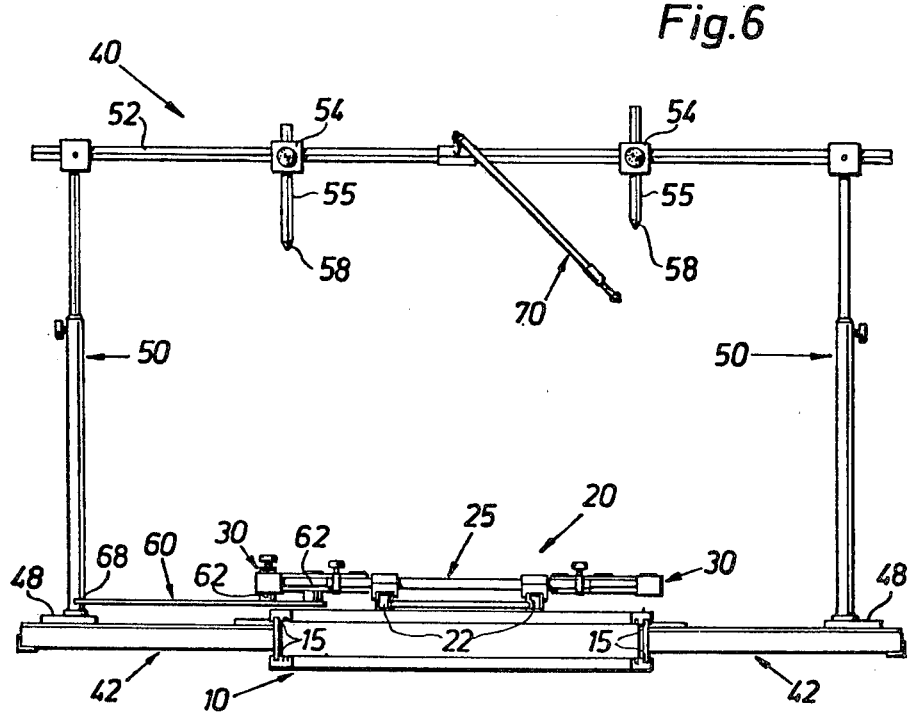
FIG. 6 shows a schematic front view of the upper and lower measuring systems mounted on the bench base and connected to each other.

FIGS. 4 through 6 illustrate how this orientation problem is solved according to the invention. FIG. 4 shows an adjustment rail 60 which is equipped with two fixed guide pins 62 with shoulders 64. The rail 60 is designed to be fixed on one of the outer slides 30 of the measuring bridge 20 by first inserting the guide pins 62 from below upwardly into two of the bushings 36 of the measuring tool holders 32 of the slide 30. The rail 60 is then secured in place on tool holder 32 by means of two shoulder screws 66 extending downwardly through the two bushings 36 on the tool holder and threaded into the central openings 65 in the guide pins 62. Shoulders 64 bear against and have a close fit with the lower ends of bushings 36 such that rail 60 is very accurately located relative to the associated tool holder 32. At its free projecting end the adjustment rail 60 is equipped with an accurately located semi-circular cut-out 68 designed to receive with a close fit one of the columns 50 of the stand 40 as a guide, as illustrated in FIG. 5. FIG. 5 also shows the stable connection between the support 42 of the measurement stand 40 and the T-shaped track 15 on the base bench 10. As can be seen, the two beams 44 of the support are rigidly connected to a guide plate 43 which is slideably mounted in the T-shape track 15 so that at selected points along the latter it may be fixed by horizontal screws 45 which are threaded through the guide plate 43 and engage with the side of the bench 10, and also by means of vertical jack screws 46 which lift a locking plate 47 which engages via an edge section with the upper edge rail 14 on the bench, so that the guide plate 43 of the mounting 42 is forced to the bottom of the T-shaped track 15 as can be seen in FIG. 5. After a column 50 is engaged with the cut-out 68 at the end of rail 60, the baseplate 48 at the lower end of the column can be fixed by means of a screw and a locking bracket 49 in the required position on the upper faces of the beams 44, as is also shown in FIG. 5. The columns 50 of each required stand 40 is mounted on bench 10 in this manner. Thus, each measuring tool 55 on stands 40 can be very accurately located relative to the tools 35 on the associated measuring bridge 20 and therefore relative to the designated reference or orientation points on the vehicle body supported on bench 10.

As a whole, therefore, the two measuring systems work together as shown in FIG. 6. The primary system comprising the measuring bridge 20 with its measuring tools 35 rests on the bench 10. FIG. 6 shows schematically the longitudinal rails 22 of the bridge and one of its transverse slides 25 with the outer slides 30. The secondary system comprising the measuring stand 40 with its measuring tools 55 is firmly connected via its support 42 to the bench 10 due to the engagement of the support in the T-shaped track 15 on the bench. In FIG. 6 the left-hand column 50 of the stand is shown connected to the co-acting support 42 in a specifically oriented position relative to the measurement bridge 20, due to the fact that the above-described adjustment rail 60 is connected to the left-hand outer slide 30 of the slide 25, so that the said left-hand column 50 is held in the guide recess 68 in the adjustment rail. The right-hand column 50 can be located in a similar manner relative to the right-hand slide 30.

The measuring stand 40 can be equipped with another very valuable measuring device or, more precisely, checking device in the form of a telescopically extensible locating pin 70 which is pivotably fixed in the center of the crossbeam 52 of the measuring stand 40. By insuring that this locating point is positioned in the longitudinal plane of symmetry of the body which is being examined, the symmetrical position of various reference points on the body can be checked, such as, amongst other things, door jams which are disposed opposite each other, for example.

It will be understood, although not specifically shown, that the stand 40 is provided with measurement scales on its various components for determining precisely the location and space of the measuring points 58 and the end of the locating pin 70. Thus, scales are provided for the extensions of the columns 50, along the cross beam 52, and on the measuring tools 55. Such measurement scales will enable an exact determination of the location of the measuring points 58 on stand 40 relative to the measuring points 38 on bridge 20.

I claim:

1. An arrangement for determining and, if required, correcting the position of selected reference points on a vehicle body or chassis comprising, a stable set-up device in the form of a rigid, substantially horizontal bench having parallel sides and over which a body which is to be measured and checked is suspended by means connected with the bench in a position which is fixed relative to the bench and also comprising a measuring unit which co-acts with the bench, said arrangement also including a measuring bridge supported on said bench for adjustment lengthwise thereof (x axis), said bridge comprising slide members on which upwardly extending locating tools can be adjustably displaced transversely (y axis) and vertically (z axis), the amount of said displacement being readable on appropriate scales, both the bench and the measuring bridge having co-acting reference surfaces for the accurate orientation of the two components relative to each other so that the position of the measuring tools relative to predetermined reference points on the vehicle body can be adjusted and determined, characterized by another measuring unit in the form of an inverted, substantially U-shaped stand adapted to span said bench transversely, said stand having laterally spaced, upright legs connected at their upper ends by a cross bar, said bench having rigid support members projecting laterally outwardly from opposite sides thereof on which the lower ends of said legs are mounted for adjustment, said supports being adjustably mounted on said bench, at least one auxiliary locating tool mounted on said cross bar for adjustment vertically and lengthwise thereof, the arrangement being such that the auxiliary locating tools extend downwardly from above and towards the body suspended over the bench, said stand and said measuring bridge having fixed abutments thereon adapted to interengage with selected abutments fixed on a rigid orientation gauge extending therebetween to enable adjustment of the stand on the bench to a precise position relative to said measuring bridge so that the positions of the measuring tools on the bridge and stand relative to each other can be precisely determined.

2. An arrangement according to claim 1 characterized in that the legs of the said stand comprise telescopically extensible columns and said cross beam comprises a tubular beam, said stand having length scales thereon such that the height of the auxiliary tools above the bench and their distance at right angles from the sides of the bench can be determined and thus also the corresponding distances of the reference points on the body located by the measuring tools.

3. An arrangement according to claim 2 wherein said cross beam is a tube of non-circular cross section, said auxiliary tools being mounted on slides slideably engaging said cross beam and maintaining the auxiliary tools oriented perpendicular to the plane of said bench.

4. An arrangement according to claim 1 wherein said bench is provided with rectilinear guide tracks along the opposite sides thereof, said supports being engaged in said guide tracks and including threaded studs on said supports adapted to bear against said guide tracks to lock the supports against movement in said tracks.

5. An arrangement as called for in claim 1 wherein the abutments on said measuring bridge comprise a pair of vertical sockets, said orientation gauge having a pair of studs thereon releasably engaging said sockets to retain the gauge in a predetermined fixed position relative to the measuring bridge, said gauge also having a socket adjacent the outer end thereof adapted to engage with a close fit an abutment on the stand.

6. An arrangement as called for in claim 5 wherein said last-mentioned socket comprises a laterally outwardly opening recess at the outer end of the gauge adapted to partially encircle an upright leg of the measuring stand so that the leg is precisely located relative to the measuring stand along the x and y axes.

7. An arrangement as called for in claim 1 including a depending measuring rod supported on said cross beam at the center thereof for pivotal movement in a vertical plane.

* * * * *